Patented Feb. 1, 1949

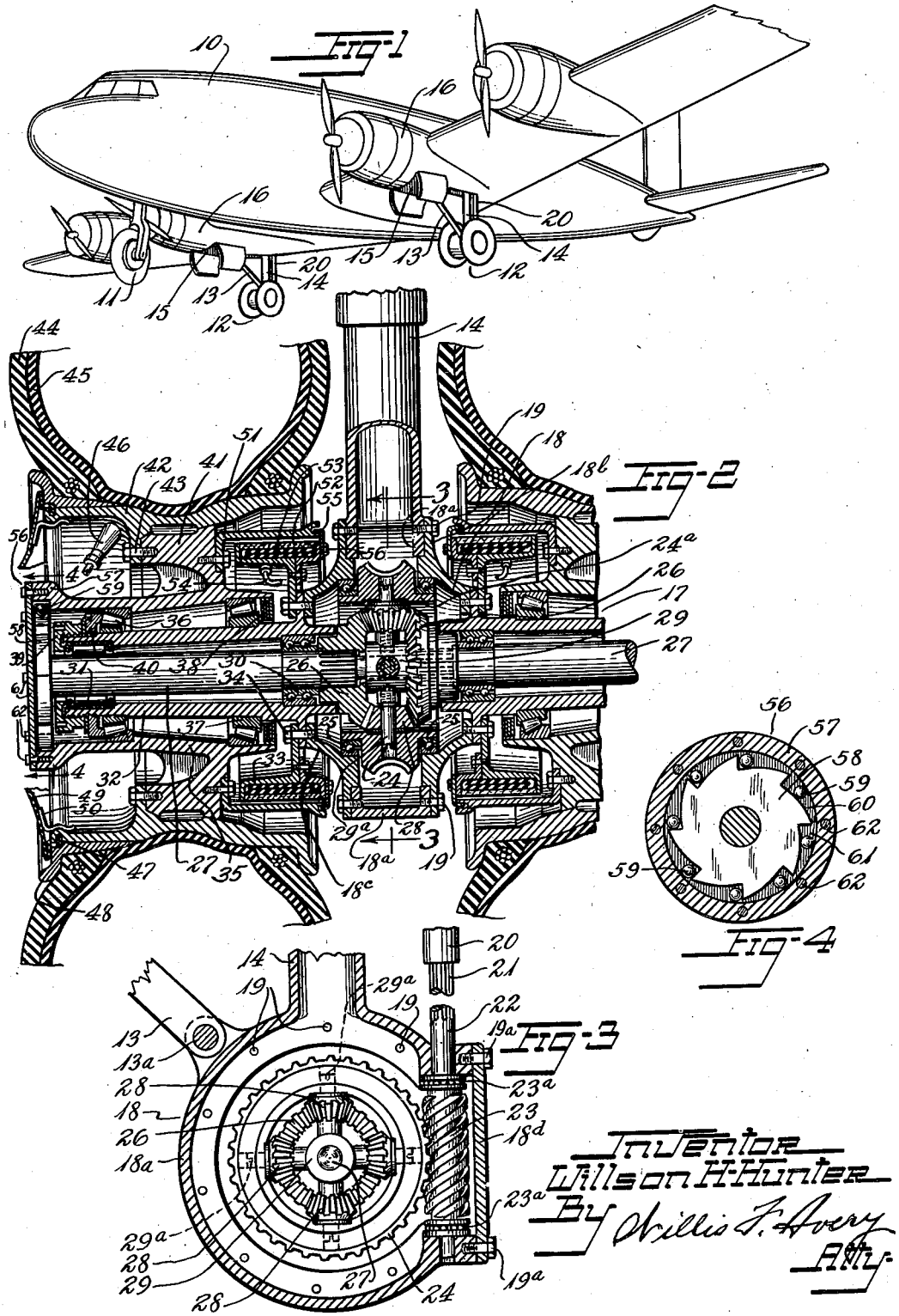

2,460,387

UNITED STATES PATENT OFFICE 2,460,387

LANDING GEAR

Willson H. Hunter, Lakewood, Ohio, assignor to The B. F. Goodrich Company, New York, N. Y., a corporation of New York Application December 3, 1943, Serial No. 512,720

3 Claims. (Cl. 244—50)

1

This invention relates to landing gear for aircraft and especially to power-driven wheel assemblies for aircraft.

The principal objects of the invention are to provide a compact wheel and driving mechanism useful for taxiing the aircraft and for rotating the wheels prior to landing, to provide for the incorporation therewith of a brake, to incorporate the above-stated features in a compact dual wheel assembly, to provide for longer life of the tires on the wheels, and to provide convenience of manufacture, assembly, and maintenance, and effectiveness of operation.

These and other objects and advantages will be apparent from the following description, reference being had to the accompanying drawings which form a part of this specification and in which:

Fig. 1 is a perspective view of an aircraft having landing gear including dual wheel assemblies constructed in accordance with and embodying the invention, Fig. 2 is a vertical section, as viewed from the front, of one of the wheel assemblies of Fig. 1, parts being broken away.

Fig. 3 is a section taken along the line 3—3 of Fig. 2, and

Fig. 4 is a section taken along the line 4—4 of Fig. 2.

In the illustrative embodiment of the invention shown in the drawings, an airplane 10 is provided with retractable landing gear of the tricycle type comprising a wheel structure 11 at the front of the fuselage and spaced-apart dual wheel structures 12 at the wings. The dual wheel structures include supporting struts 13 and 14; the struts 14 may have telescopic mechanisms (not shown) for absorbing shocks during landing and taxiing operations. Each wheel structure 12 may be retracted and positioned within the space at 15 in engine mounting structure 16 during flight. The dual wheel structure 12 includes a power-driven wheel assembly 17 having a differential housing 18 comprising a banjo member 18a and side plates 18b and 18c secured to such banjo member 18a as by suitable circumferentially spaced-apart screw fasteners 19. The strut 13 is pivotally attached at 13a to such housing 18 as shown especially in Fig. 3, and the strut 14 may be integral with the banjo member 18a.

Since the wheel assembly 17 is constructionally symmetrical about the strut 14, only one side of the dual construction need be described specifically. For driving the dual wheel assembly 17, a tubular drive shaft 20 from a suitable source of power, such, for example, as an electric or fluid-operated motor which may be disposed in the engine mounting structure 16, is slideably engaged with a splined end at 21 of an extension 22 of a worm 23 rotatably mounted on ball bearings 23a in the differential housing 18 having a protecting cover 18d separably retained by fasteners 19, 19a. The worm 23 is in driving engagement with a worm gear 24. A differential driving mechanism for the wheels includes the worm 23 and the worm gear 24, which gear is rotatably mounted at its side flanges 24a on spaced-apart ball bearings 25 within and supported by the housing 18, and includes beveled side gears 26 mounted on splined ends of axles or shafts 27 and meshing with pinion or spider gears 28 supported by a spider 29 having struts 29a which project through registering apertures in the rim of the worm gear 24, as shown especially in Figs. 2 and 3.

The shaft 27 is supported adjacent its splined end by a ball bearing 30 and at the opposite end by a needle bearing 31 mounted within a sleeve or shaft housing 32 and these bearings are positioned against shoulders in such housing 32. The shaft housing 32 and an annular channeled torque frame 33 are attached to and supported by the differential housing 18 by suitable screw fasteners 34, and by this attachment at both sides of the landing gear unit the laterally projecting shaft housings or sleeves 32 together with the housing 18 and the strut structure 13, 14 as seen from the front constitute an inverted T-support with the strut structure 13, 14 constituting the stem of the T and the sole supporting connection of the landing gear to the aircraft. A wheel hub 35 is rotatably mounted on the sleeve or shaft housing 32 by spaced-apart roller bearings 36 and 37 seated against shoulders in the hub 35. The bearing 37 is positioned and protected against grease leakage and the entrance of dirt by a suitable retainer and sealing member 38. For retaining the wheel hub 35 on the shaft housing 32 and positioning the roller bearing 36 and the needle bearing 31, a nut 39 which may be of the locking type, threadedly engages the end of the axle housing 32 and engages a retaining ring structure 40 which may include a lubricant seal.

The wheel hub 35 includes an outwardly extending annular web or flange portion 41 to which portion an annular rim 42 may be mounted as by suitable circumferentially spaced-apart screw fasteners 43. The rim 42 is adapted to receive a pneumatic tire comprising a casing 44 and an inner tube 45 with its inflating valve 46, which valve extends through an aperture in the rim 42. A circumferentially split ring 47 seated in a recess holds a demountable rim flange 48 on the rim 42 for facilitating detachably mounting the pneumatic tire. For protecting the end of the wheel assembly 17 and for promoting streamline flow of air at such end, a wheel cap 49 including spaced-apart spring clips 50 may be detachably secured to the rim 42.

Braking of the wheel assembly 17 may be accomplished by a fluid-operated brake structure disposed desirably adjacent the differential housing 18 and between the wheel hub 35 and the rim 42. The brake structure comprises an annularly flanged brake drum 51 in overlying spaced-apart relation with the torque frame 33, the drum being attached as by screw fasteners to the flange portion 41 of the wheel hub 35 for rotation with the wheel. Friction blocks 52 are disposed within the circumferential channel of the torque frame 33 adjacent the brake drum 51 for engaging the inner surface thereof. An annular inflatable tube 53 is mounted between the friction blocks 52 and the torque frame 33 for moving the blocks into sliding contact with the brake drum 51 upon inflation of the tube by fluid under pressure admitted through an inlet connector 54 in communication therewith and with a suitable source of fluid. Associated retractor springs (not shown) may be included for facilitating the return of the friction blocks to their released position within the channel of the torque frame 33. A guard ring 55 may be attached as by screw fasteners 56 to the torque frame as shown especially in Fig. 2, for preventing the entrance of foreign material thereby maintaining the effective operation of the brake structure.

In some cases it may be desirable to provide free rotation of both wheels relative to the driving mechanism as in the case of a landing with the power to the driving mechanism being cut off. This may be accomplished by the arrangement shown especially in Figs. 2 and 4, utilizing an over-running clutch or free-wheeling structure 56 for each wheel. The free-wheeling structure 56 may comprise an outer casing 57, which casing may be an integral flange portion at the end of the wheel hub 35, and an inner hub or cam 58 integral with the end of the axle or shaft 27. Between the outer casing and the inner cam is a series of hardened steel rollers or balls 59 which run in slightly tapered race-ways 60. A cover plate 61 for retaining the balls 59 in position and for preventing the entrance of foreign material may be attached to the outer casing 57 as by screw fasteners 62. When power is applied through the axle 27 to the inner cam 58, the balls 59 frictionally contact the outer casing 57 rotating with the wheel hub 35. When no power is delivered to the axle, the rotation of the wheel by virtue of its contact with the ground rotates the outer casing breaking the driving connection between the wheel and the shaft, thereby permitting the wheel to rotate freely relative to the shaft 27.

For taxiing the aircraft, or for rotating the wheels prior to landing, power is supplied through the drive shaft 20 to the worm 23 thus rotating the worm gear 24, which rotation drives the shaft 27 through the differential drive mechanism. The shaft in turn transmits rotative power through the free-wheeling structure to the wheel hub 35, thereby causing the wheel to rotate at the desired speed. Braking is accomplished by admitting fluid under pressure to the inflatable tube 53 thus engaging the friction blocks 52 with the drum 51, thereby retarding or preventing rotation of the wheels.

The invention thus provides for effectively driving the wheels of the aircraft, facilitating taxiing such aircraft without using the propellers, and also provides for rotating the wheels prior to landing, which rotation may be at a speed equal to or substantially equal to the ground speed of the aircraft, thereby establishing rolling contact at impact and reducing wear and shock. Also, maneuverability of the aircraft on the ground is promoted.

Variations may be made without departing from the scope of the invention as it is defined in the following claims.

I claim:

1. An aircraft dual wheel landing gear comprising a pair of landing wheels in close side-by-side relation and including axially aligned hubs, a supporting strut structure extending generally vertically between said wheels in the landing position, a housing at the lower end of the strut structure between said wheels and a pair of supporting tubular members united with and projecting laterally from said housing and constituting with said strut structure and housing a T-shaped support, said hubs being positioned in telescopic relation on said tubular members, bearings between each hub and tubular member at spaced-apart positions along the member, driving means in said housing and extending through said tubular members to the outer ends thereof, means at said outer ends for connecting said driving means with the respective wheel, and brake structures individual to said wheels and disposed between said housing and the respective wheel, each brake structure comprising brake elements one of which is mounted on said T-shaped support at said housing and the other brake element is mounted on the adjacent wheel.

2. An aircraft dual wheel landing gear comprising a pair of landing wheels in close side-by-side relation and including axially aligned hubs, a supporting strut structure extending generally vertically between said wheels in the landing position, a housing at the lower end of the strut structure between said wheels and a pair of supporting tubular members united with and projecting laterally from said housing and constituting with said strut structure and housing a T-shaped support, said hubs being positioned in telescopic relation on said tubular members and terminating at their inner ends short of said housing providing spaces between the hubs and housing, rolling-contact bearings between each hub and tubular member at spaced-apart positions along the member, driving means in said housing and extending through said tubular members to the outer ends thereof, over-running clutch means at said outer ends for free-wheeling connection of said driving means with the respective wheel, and brake structures individual to said wheels and disposed in said spaces between said housing and said hub, each brake structure comprising brake elements one of which is mounted on said housing and the other brake element is mounted on the adjacent hub at said inner end thereof.

3. An aircraft dual wheel landing gear comprising a pair of landing wheels in close side-by-side relation and including axially aligned hubs, a supporting strut structure extending generally vertically between said wheels in the landing position, a housing at the lower end of the strut structure and a pair of supporting tubular members united with and projecting laterally from said housing and constituting with said strut structure and housing a T-shaped support, said hubs being positioned in telescopic relation on said tubular members and having an end overhanging the outer ends of the tubular members and terminating at their inner ends short of said housing providing spaces between the hubs and housing, rolling-contact bearings between each hub and tubular member at spaced-apart positions along the member, driving means in said housing including drive shafts individual to said wheels extending through said tubular members and beyond said outer ends thereof, over-running clutch means at said outer ends for free-wheeling connection of said shafts with the overhanging ends of said hubs, and brake structures individual to said wheels and disposed in said spaces between said housing and said inner ends of said hubs, each brake structure comprising brake elements one of which is mounted on said housing and the other brake element is mounted on the adjacent hub at said inner end thereof.

WILLSON H. HUNTER.

REFERENCES CITED

The following references are of record in the file of this patent:

UNITED STATES PATENTS

| Number | Name | Date |
|---|---|---|
| 1,092,494 | Lindsay | Apr. 7, 1914 |
| 1,187,710 | Church | June 20, 1916 |
| 1,317,910 | Distefano | Oct. 7, 1919 |
| 1,524,352 | Gephart | Jan. 27, 1925 |
| 1,708,249 | Abel | Apr. 9, 1929 |
| 1,812,143 | Dugan | June 30, 1931 |
| 2,030,548 | Smeets | Feb. 11, 1936 |
| 2,287,491 | Wolverton et al. | June 23, 1942 |
| 2,298,523 | Webster | Oct. 13, 1942 |
| 2,401,364 | Mercier | June 4, 1946 |

FOREIGN PATENTS

| Number | Country | Date |
|---|---|---|
| 143,591 | Great Britain | May 28, 1920 |
| 151,635 | Great Britain | Sept. 25, 1920 |